May 11, 1954

N. P. LEDBETTER 2,678,192

ROTARY TRANSMISSION HEAD

Filed Feb. 23, 1951

NUBERN P. LEDBETTER
INVENTOR.

BY

ATTORNEY

NUBERN P. LEDBETTER
INVENTOR.
ATTORNEY

Patented May 11, 1954

2,678,192

UNITED STATES PATENT OFFICE 2,678,192

ROTARY TRANSMISSION HEAD

Nubern P. Ledbetter, Dallas, Tex.

Application February 23, 1951, Serial No. 212,452

5 Claims. (Cl. 255—23)

This invention relates to a rotary transmission head.

Rotary transmission heads employed in drilling wells are employed to drive a horizontal rotary table which is provided with means for gripping a kelley which extends vertically through the transmission head. The blocks which engage the kelley are subjected to considerable wear and it would be desirable to provide such blocks having a plurality of kelley engaging faces which could be successively used to engage the kelley so that when one face becomes worn, another can be placed in contact with the kelley. The gearing for driving the rotary table and the bearings which support the rotary table must be efficiently lubricated and foreign matter must be excluded from the gearing, the bearings and the lubricant. Labyrinth seals and expansible or flexible seals have been heretofore employed to prevent blowing mud and debris, forced upwardly out of the well when pockets of gas are pierced during the drilling operation, from penetrating through openings in the bottom of the rotary transmission head. Even the smallest openings in the bottom of the head will permit such foreign matter to enter into the interior of the head since the mud and debris blow out at high velocity and pressure. The expansible or flexible seals are subject to wear and aging while the labyrinth seals are complex and difficult to manufacture as well as not efficient for the purpose described. It would be desirable, therefore, to have a rotary transmission head which does not have any openings in its bottom through which such foreign matter could penetrate into the interior of the head.

Accordingly, it is an object of the invention to provide a new and improved rotary transmission head.

It is another object of the invention to provide a new and improved rotary transmission head having a rotary table provided with multi-faced kelley-engaging blocks which can be selectively adjusted to place a new face in contact with the kelley when the previously employed face becomes worn.

It is still another object of the invention to provide a new and improved rotary transmission head in which the gearing and bearings are efficiently lubricated.

It is a further object of the invention to provide a new and improved rotary transmission head having a housing which does not have a seal through which blown mud and debris can penetrate into the interior of the head.

It is a still further object of the invention to provide a new and improved rotary transmission head having a housing for retaining a fluid lubricant which does not employ a seal to retain the fluid in the housing.

For a better understanding of the invention, reference may be had to the following description taken in connection with the accompanying drawing and its scope will be pointed out in the appended claims.

Figures 1, 2:
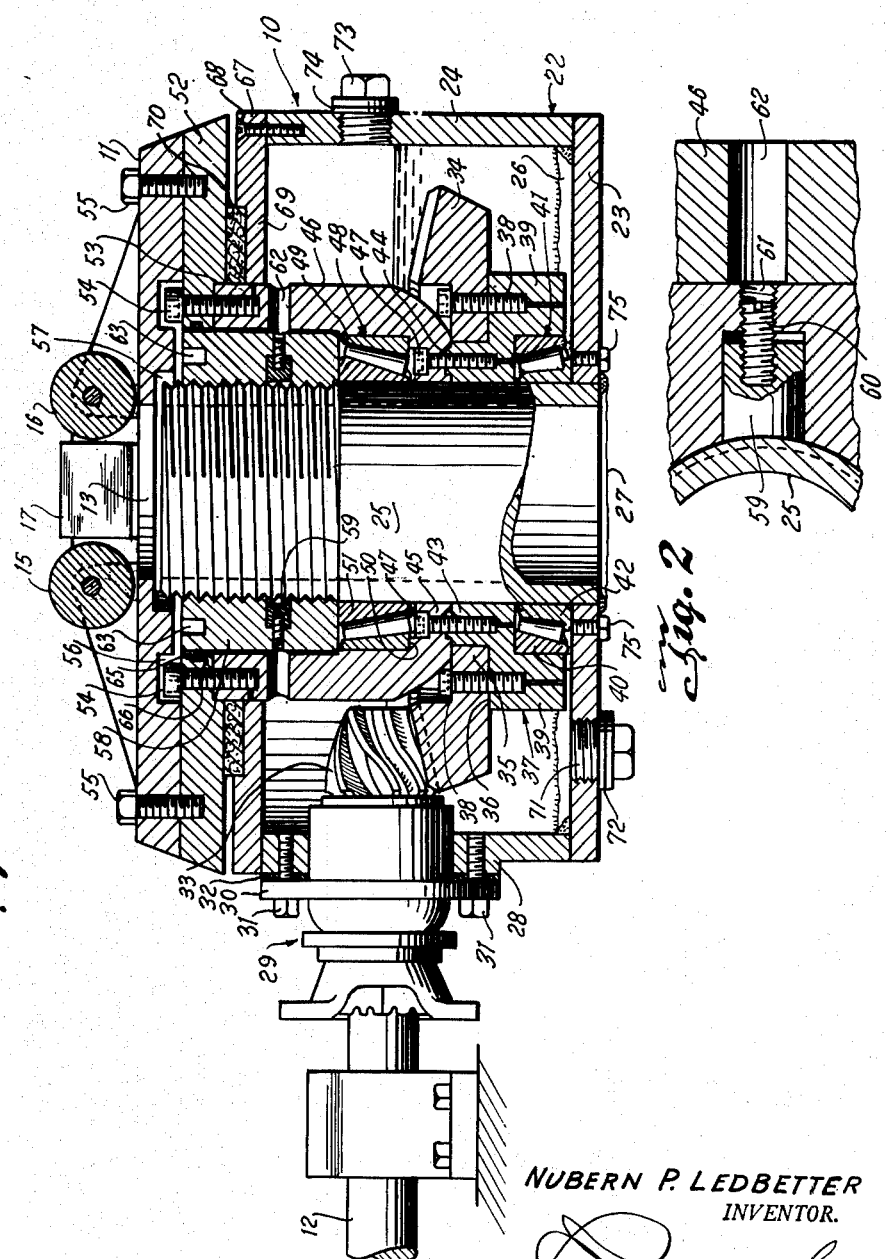
Figure 1 is a partly sectional view of a preferred embodiment of the invention.
Figure 2 is an enlarged sectional view of a portion of the device shown in Figure 1.
Figure 3:
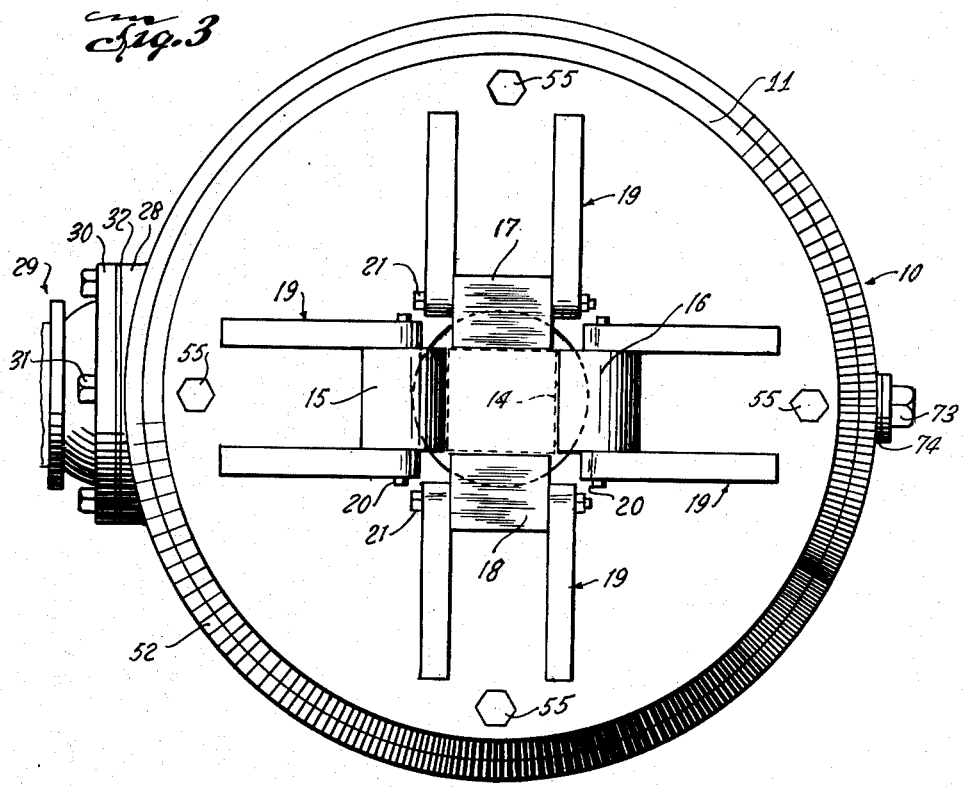
Figure 3 is a top plan view of the device shown in Figure 1.
Figure 4:
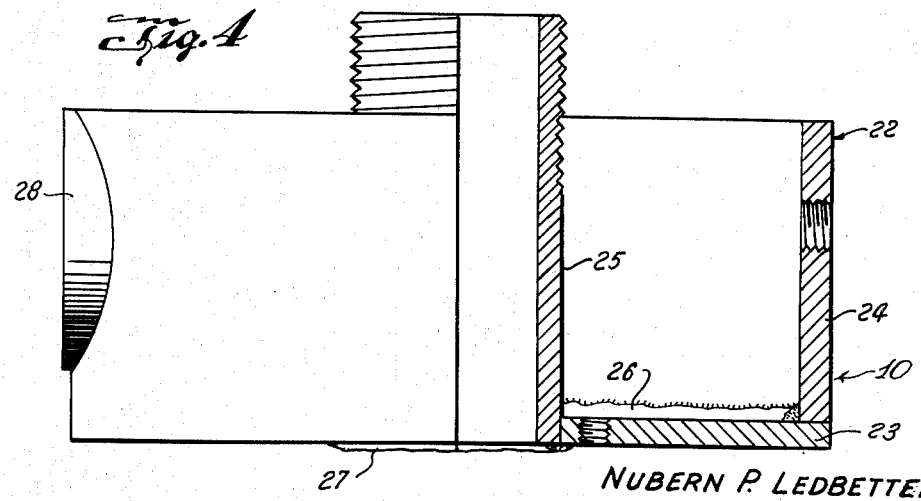
Figure 4 is a side view of the housing of the device shown in Figure 1, with one portion shown in section.

Referring now to the drawing, the rotary transmission head 10 is employed to rotate the rotary table 11 when a driving shaft 12 is rotated. The rotary table has a central aperture 13 through which a kelley 14 may extend. As is well known to those skilled in the art, the upper end of the kelley is supported by a tackle block (not shown) and the lower end is fastened to the drill pipe (not shown). The kelley is square in cross-section and is rotated by the rotary table 11 by means of the opposed rollers 15 and 16 and the opposed blocks 17 and 18. The rollers and the blocks are rotatably mounted on similar brackets 19, rigidly secured to the table 11 by welding or other conventional means, by means of pins 20 and bolts 21, respectively.

The blocks 17 are square in cross-section so that when one face of a block becomes worn due to its contact with a side of the kelley, the block may be rotated so as to present a new unworn face to the kelley. In this manner full efficiency of the rotary may be greatly prolonged.

The rotary transmission head 10 has a housing 22 formed on an annular bottom plate 23 on which is rigidly secured an outer cylindrical wall 24. The bottom plate 23 has a central circular aperture and an inner cylindrical wall 25 is rigidly secured to the bottom plate and extends about and upwardly from the circular aperture. The inner wall 25 is of greater height than the outer wall 24 and its upper end is threaded exteriorly for a purpose to be described below. The walls 24 and 25 may be secured to the bottom plate 23 by welding as is indicated by the welds 26 and 27, respectively. A lubricant fluid may therefore be contained in housing 22.

The outer wall 24 is provided with an outwardly extending collar 28 which surrounds an aperture in the outer wall. A conventional transmission and bearing assembly 29 is secured to the outer wall 24 by means of a ring 30 and bolts 31. A gasket 32 is interposed between the ring 30 and collar 28 to make the connection fluid tight.

The transmission and bearing assembly 29 connects a pinion gear 33 to the drive shaft 12. The pinion gear 33 meshes with a ring gear 34 which is disposed in the housing 22 between the inner and outer walls.

The ring gear 34 has a reduced inner flange 35 which rests on an outer upper annular surface 36 of a supporting sleeve 37. The flange 35 of the ring gear and the supporting sleeve 37 are provided with registering apertures through which bolts 38 extend to secure the ring gear to the supporting sleeve. The supporting sleeve 37 has a downwardly extending outer flange 39 which abuts the outer movable race 40 of a roller bearing 41. The roller bearing 41 has an inner stationary race 42 which abuts the inner wall 25 and the bottom plate 23.

The upwardly extending flange 43 of the supporting sleeve has a top annular flange 44 which fits in a corresponding groove in the bottom surface of an inwardly extending flange 45 of a driving sleeve 46. The driving sleeve 46 is rigidly secured to the supporting sleeve by a plurality of bolts 47 which extend through registering apertures in the flanges 45 and 43. The flange 45 has suitable recesses in which the heads of bolts 47 may fit for turning movement.

The upper roller bearing 48 has a movable outer race 49 which abuts the inner surface of the driving sleeve 46 and rests on an abutment 50 provided by the driving sleeve. The inner stationary race 51 of the bearing abuts the inner wall 25. It will be apparent now that the weight of the ring gear 34 and the sleeves 37 and 46 and all elements attached thereto is borne by the lower bearing 37 and that the upper bearing 48 acts as an aligning bearing to maintain the sleeves and the ring gear properly centered and to prevent tilting about a horizontal axis. Stationary races 42 and 51 may be kept stationary by a tight fit with inner wall 25 or in any other conventional manner.

A driving plate 52 has an annular abutment 53 which abuts the upper outer surface of the driving sleeve 46. The driving plate 52 rests on the driving sleeve 46 and is rigidly secured to the driving sleeve by a plurality of bolts 54. The rotary table 11 rests upon the driving plate 52 and is secured to it by the bolts 55. The lower surface of the rotary table is provided with an annular groove 56 to provide room for the heads of the bolts 54. The lower surface of the rotary table 11 is also provided with an annular recess 57 adjacent its central aperture in order to prevent any contact between the upper portion of the inner wall 25 and the rotary table.

It will now be apparent that rotation of driving shaft 12 will cause the pinion gear to drive the ring gear 34 and thus cause rotary movement of the sleeves 37 and 46. Since the rotary table 11 is rigidly connected to the driving sleeve 46 through the driving plate 52, rotary movement of the ring gear 34 will result in rotary movement of the rotary table.

In order to maintain bearing 48 in place, a stationary sleeve 58 is screwed on the upper threaded end of the inner wall 25 and contacts face 51 of bearing 48 to prevent upward movement of the latter. The stationary sleeve 58 is held in place by a plurality of blocks 59 slidably and rotatably disposed in circular recesses in the inner surface of the stationary sleeve. A screw 60, which extends through a threaded bore 61 in the stationary sleeve, is secured to each block 59 to move the block into contact with the inner wall 25 and lock the stationary sleeve 58 to the inner wall. The driving sleeve 46 is provided with a plurality of transverse apertures 62 which register with the bores 61 in order that a screwdriver may be inserted through the apertures 62 to engage the heads of the screws 60.

The stationary sleeve 58 is also provided with a plurality of wrench receiving upper recesses 63 so that the sleeve 58 may be easily screwed on the inner wall 25.

An annular groove 65 is provided in the inner vertical surface of the driving plate 52 to receive a felt ring or packing 66 which closes or seals the space between the stationary sleeve and the driving plate. The packing 66 prevents foreign matters from dropping into the interior of the housing 22 through this space.

A top plate 67 which is rigidly secured to the top of the outer wall 24 by a plurality of screws 68 extends to the driving sleeve 46 to close the top of the housing. The inner portion of the top plate is reduced as at 69 to form a seat for an annular ring 70 of felt or other resilient substance. The felt abuts the side of the driving sleeve 46 and the bottom of the driving plate to prevent foreign matter from falling between the driving sleeve and the top plate into the interior of the housing.

A drain screw plug 71 having a gasket 72 closes a drain hole in the bottom plate 67. A similar screw plug 73 having a gasket 74 closes a filling hole in the outer wall 72. Screws 75 entering the bottom plate 23 adjacent the inner wall 25 can be removed to allow the insertion of a suitable tool to effect displacement of the stationary bearing race 42 to facilitate its removal. Upon replacement of the screw 75 they are preferably sealed with paint or red lead to preclude oil leakage.

It will be apparent that the housing 22 will retain a large quantity of lubricant which will contact all moving surfaces of the device which need lubrication. Moreover, since the walls and bottom plate of the housing are welded together, no seals are necessary to maintain the oil in the housing. No foreign matter can be forced or blown into the housing from the bottom. The drain plug 71 and the screws 75 may be finely threaded so that they form a liquid tight joint with the bottom plate.

It will be apparent that various changes and modifications can be made in the illustrated device without departing from the invention. For example, the ring gear, the supporting sleeve and the driving sleeve may be made in a single piece, as may be made the wall and bottom of the housing 10. It is intended therefore, in the appended claims to cover all such changes and modifications as fall within the spirit and scope of the invention.

What is claimed is:

1. In a rotary transmission head: a liquid-tight housing having an outer wall, a cylindrical inner wall, and a bottom between, abutting and connected to said walls to seal the space between the lower extremities of said outer wall and said cylindrical wall against upward passage of fluid into said housing; a bearing disposed on said bottom plate, said bearing also being disposed about and abutting said inner wall; a ring gear rotatably mounted on said bearing; a pinion gear for driving said ring gear mounted on said outer wall and adapted to be driven from without said housing; a rotary table disposed above said housing; and a tubular member rigidly connecting said ring gear and said rotary table, said tubular member being disposed about said inner wall, said table having an aperture registering with the interior of said inner cylindrical wall.

2. In a rotary transmission head: a liquid-tight housing having an outer wall, a cylindrical inner wall, and a bottom between, abutting and connected to said walls, said bottom being effective to close the lower end of said housing against upward passage of fluid into said housing; a bearing disposed on said bottom plate, said bearing also being disposed about and abutting said inner wall; a ring gear rotatably mounted on said bearings; a pinion gear for driving said ring gear mounted on said outer wall and adapted to be driven from without said housing; a rotary table disposed above said housing; a tubular member rigidly connecting said ring gear and said rotary table, said tubular member being disposed about said inner wall; and an aligning bearing between said tubular member and said inner wall, said table having an aperture registering with the interior of said inner cylindrical wall.

3. In a rotary transmission head: a liquid-tight housing having an outer wall, a cylindrical inner wall, and a bottom between, abutting and connected to said walls; a ring gear rotatably mounted in said housing on said bottom between said walls; a pinion gear for driving said ring gear mounted on said outer wall and adapted to be driven from without said housing; a rotary table disposed above said housing; a tubular member rigidly connecting said ring gear and said table; and a top mounted on said outer wall and extending inwardly to said tubular member to close the top of said housing, said tubular member being disposed about said inner wall, said table having an aperture registering with the interior of said inner cylindrical wall.

4. In a rotary transmission head: a liquid-tight housing having an outer wall, a cylindrical inner wall, and a bottom between, abutting and connected to said walls; a bearing disposed on said bottom plate, said bearing also being disposed about and abutting said inner wall; a ring gear rotatably mounted on said bearing; a pinion gear for driving said ring gear mounted on said outer wall and adapted to be driven from without said housing; a rotary table disposed above said housing; a tubular member rigidly connecting said ring gear and said rotary table, said tubular member being disposed about said inner wall, said table having an aperture registering with the interior of said inner cylindrical wall; and a top mounted on said outer wall and extending inwardly to said tubular member to close the top of said housing.

5. In a rotary transmission head: a liquid-tight housing having an outer wall, a cylindrical inner wall, and a bottom between, abutting and connecting to said walls; a bearing disposed on said bottom plate and about and abutting said inner wall; a ring gear rotatably mounted on said bearing; a pinion gear for driving said ring gear mounted on said outer wall and adapted to be driven from without said housing; a rotary table disposed above said housing; a tubular member rigidly connecting said ring gear and said rotary table, said tubular member being disposed about said inner wall; an aligning bearing between said tubular member and said inner wall; and a sleeve rigidly secured to said inner wall above said aligning bearing to retain said aligning bearing in place, said table having an aperture registering with the interior of said inner cylindrical wall.

References Cited in the file of this patent

UNITED STATES PATENTS

| Number | Name | Date |
|---|---|---|
| 1,508,590 | Boykin | Sept. 16, 1924 |
| 1,639,337 | Goeser | Aug. 16, 1927 |
| 2,067,921 | Hild | Jan. 19, 1937 |
| 2,169,264 | Long | Aug. 15, 1939 |
| 2,171,176 | Greve | Aug. 29, 1939 |
| 2,221,176 | Maier | Nov. 12, 1940 |
| 2,276,561 | Bloss | Mar. 17, 1942 |
| 2,286,593 | Abegg | June 16, 1942 |
| 2,346,958 | Abegg | Apr. 18, 1944 |
| 2,390,601 | Maier | Dec. 11, 1945 |
| 2,564,119 | Matthews, Jr. et al. | Aug. 14, 1951 |